United States Patent
Takeda et al.

(10) Patent No.: US 12,025,466 B2
(45) Date of Patent: *Jul. 2, 2024

(54) INFORMATION PROCESSING SYSTEMS, INFORMATION PROCESSING APPARATUS, AND INFORMATION PROCESSING METHODS

(71) Applicants: Nissan Motor Co., Ltd., Kanagawa (JP); RENAULT S.A.S., Boulogne-Billancourt (FR)

(72) Inventors: Wataru Takeda, Kanagawa (JP); Sho Tanaka, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,697

(22) Filed: Jul. 21, 2023

(65) Prior Publication Data

US 2024/0019266 A1    Jan. 18, 2024

Related U.S. Application Data

(63) Continuation of application No. 17/282,165, filed as application No. PCT/IB2018/001203 on Oct. 1, 2018, now Pat. No. 11,747,168.

(51) Int. Cl.
*G01C 21/00* (2006.01)
*H04W 4/024* (2018.01)
(Continued)

(52) U.S. Cl.
CPC ..... *G01C 21/3889* (2020.08); *G01C 21/3804* (2020.08); *G01C 21/3896* (2020.08);
(Continued)

(58) Field of Classification Search
CPC ............ G01C 21/3889; G01C 21/3804; G01C 21/3896; H04W 4/024; H04W 4/48; H04W 88/06; G08G 1/13
See application file for complete search history.

(56) References Cited

U.S. PATENT DOCUMENTS

| | | |
|---|---|---|
| 2008/0082260 A1 | 4/2008 | Kimura |
| 2012/0078493 A1 | 3/2012 | Schunder et al. |

(Continued)

FOREIGN PATENT DOCUMENTS

| | | |
|---|---|---|
| CN | 101556165 A | 10/2009 |
| CN | 104732790 A | 6/2015 |

(Continued)

*Primary Examiner* — Michael J Zanelli
(74) *Attorney, Agent, or Firm* — Osha Bergman Watanabe & Burton LLP

(57) ABSTRACT

An information processing apparatus includes a communicator for communicating with an on-vehicle communicator mounted on a vehicle and a communication terminal to be operated by a user, and a controller configured to acquire, from the on-vehicle communicator, an update history of at least some of map data stored in a storage medium of the vehicle, determine whether the map data needs to be updated on a basis of the update history, transmit an inquiry signal to the communication terminal via the communicator to inquire whether to allow updating of the map data when the controller has determined to need to update the map data, and transmit an update instruction signal for instructing updating of the map data to the on-vehicle communicator via the communicator when the controller has received an allowance signal for permitting updating of the map data from the communication terminal via the communicator.

5 Claims, 3 Drawing Sheets

(51) Int. Cl.
*H04W 4/48* (2018.01)
*H04W 88/06* (2009.01)

(52) U.S. Cl.
CPC ............. *H04W 4/024* (2018.02); *H04W 4/48* (2018.02); *H04W 88/06* (2013.01)

(56) References Cited

U.S. PATENT DOCUMENTS

| | | |
|---|---|---|
| 2015/0066366 A1 | 3/2015 | Pang et al. |
| 2015/0178067 A1 | 6/2015 | Ji |
| 2017/0122749 A1 | 5/2017 | Urano et al. |
| 2017/0147989 A1 | 5/2017 | Onimaru |

FOREIGN PATENT DOCUMENTS

| | | |
|---|---|---|
| EP | 1562021 A1 | 8/2005 |
| JP | 2006-126457 A | 5/2006 |
| JP | 2007-196776 A | 8/2007 |
| JP | 2008-90057 A | 4/2008 |
| JP | 2009-128162 A | 6/2009 |
| JP | 2009-222388 A | 10/2009 |
| JP | 2016-130634 A | 7/2016 |
| JP | 2017-90548 A | 5/2017 |
| JP | 2017-96769 A | 6/2017 |
| JP | 2017-207340 A | 11/2017 |

INFORMATION PROCESSING SYSTEMS, INFORMATION PROCESSING APPARATUS, AND INFORMATION PROCESSING METHODS

TECHNICAL FIELD

The present invention relates to an information processing system, an information processing apparatus, and an information processing method.

BACKGROUND ART

A known method includes a step for updating map data of a car navigation apparatus for each area and type by using update data distributed from a map center storing a master map (for example, Patent Document 1). This method includes steps for predicting the map data of the area and the type to be used in the near future based on the usage status of the map data used by the running application, requesting the map center to distribute the updated data for the map data of the predicted area and type, and acquiring the updated data distributed in response to the request, updating the map data held in the storage.

CITATION LIST

Patent Document

Patent Document 1: JP 2009-128162 A

SUMMARY OF THE INVENTION

Problem to be Solved by the Invention

However, the map data updating method described above has a problem that the user fails to use the updated map after riding on the vehicle since the method predicts the map data to be used in the future from the usage status of the map data by the running application and the map data has not updated before the user rides on the vehicle.

An object of the present invention is to provide an information processing apparatus, an information processing system, and an information processing method that enable updating map data regardless of whether a user is riding in a vehicle.

Means for Solving Problem

The present invention solves the above problem by acquiring travel plan data from a communication terminal operated by a user, determining the necessity of updating map data used for travel in accordance with a travel plan from data stored in a recording medium of a vehicle, and transmitting an inquiry signal to inquire of a user whether to permit updating of map data to a communication terminal when determining that updating of map data is necessary, and transmitting an update instruction signal for instructing updating of map data to a vehicle-mounted communicator when receiving a permission signal for permitting updating of map data.

Effect of the Invention

According to the present invention, the map data can be updated regardless of whether the user is riding on the vehicle.

BRIEF DESCRIPTION OF DRAWING(S)

Figure 1:
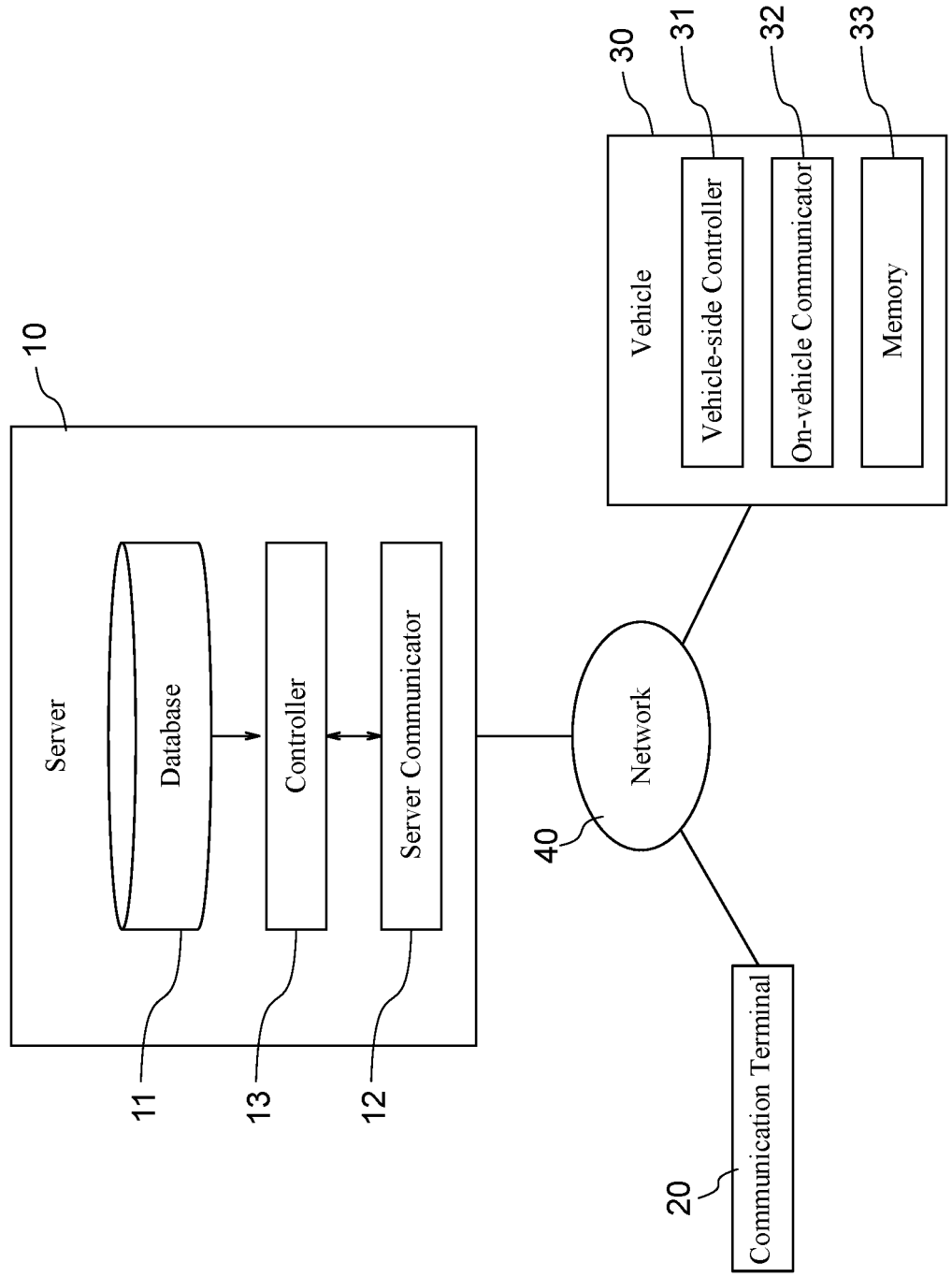
FIG. 1 is a block diagram showing an embodiment of an information processing system according to the present invention.
Figure 3B:
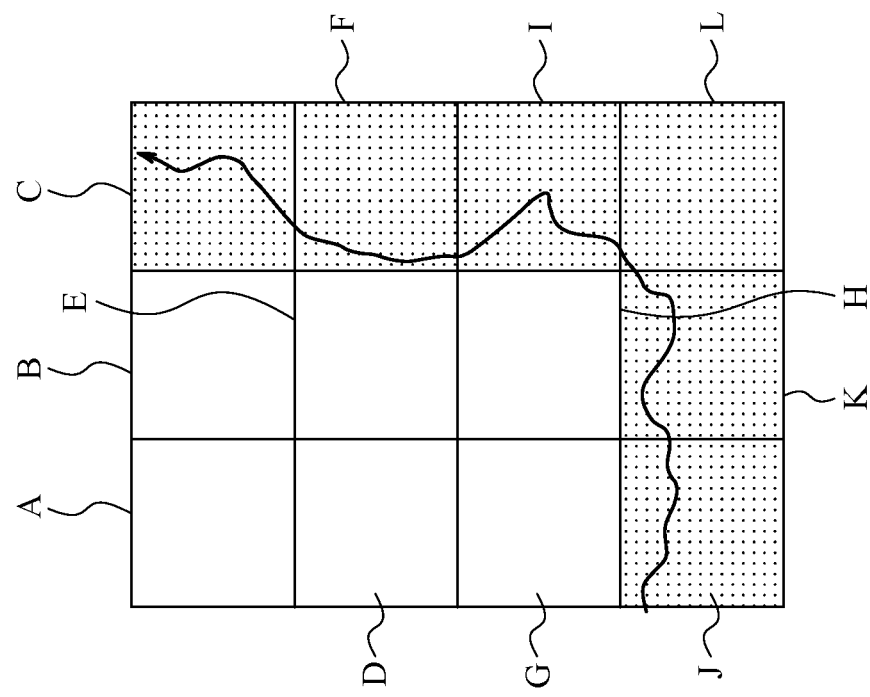
Figure 3A:

FIGS. 3(a) and 3(b) are diagrams showing an example of a vehicle dispatch schedule created by the information processing unit of FIG. 1.

MODE(S) FOR CARRYING OUT THE INVENTION

An embodiment of an information processing system according to the present invention will be described with reference to the drawings. FIG. 1 is a block diagram showing an information processing system according to an embodiment of the present invention, and the system of the present embodiment includes a server 10, a communication terminal 20, a vehicle 30, and a network 40 constituting a telecommunication network. The system of the present embodiment determines whether to update the map data used for travel from the travel plan set by the user. The system inquires of the user about permission to update the map data when the update is necessary and updates the map data when the update is permitted.

As shown in FIG. 1, the server 10 includes a database 11, a server communicator 12, and a controller 13. The database 11 is a storage for storing map data. The map data includes information for representing road networks such as nodes and links, and facility information such as POI (Point of Interest). The map data includes update information for each area. The map data changes frequently, for example due to road construction. The map data is divided into areas, and when, for example, a new road is constructed, the map data of the area including the constructed road is updated, and the map data of the area not including the constructed road is not updated. The update information is, for example, numbers representing the timing of the update or the stage of the update. The area represents the update unit of updating the map data. The area is represented by a mesh, for example. Each area separating the map data is represented by an area code and is managed by the server 10 as area information. The updates unit of the map data need not necessarily be an area, and may be, for example, a link unit or a node unit. For example, the update information is stored in correspondence with the position information indicating the node when the map data is updated on a node-by-node basis. The map data recorded in the database 11 represents the latest map information. On the other hand, the map data stored in the memory 33 of the vehicle 30 is not necessarily the latest map information, as will be described later.

The map data may be any information necessary for the traveling of the vehicle, also includes collected three-dimensional coordinate point data of the road and the road periphery by a sensor such as a camera, three-dimensional map data (so-called, dynamic map or HD map). In addition, the map data includes detailed information on roads such as the number of lanes on the road, lane width, slope, curvature, height of guardrails and side-walls, separation strips, road signs, traffic lights, and the position of pedestrian crossings. The map data may include the location of the base stations of the roads and the communication infrastructure around the roads. The map data also includes the presence or absence of an infrastructure (roadside communication system) required for automatic for the vehicles capable of automatic travel.

The server communication device 12 communicates with a plurality of vehicles 30 and a plurality of communication terminals 20 via a telecommunication network 40. Note that the network 40 need not necessarily be a common communication network between the server 10, the communication terminal 20, and the vehicle 30, and the communication network between the server 10 and the communication terminal 20 and the communication network between the server 10 and the vehicle 30 may be a communication network of different communication types. The communication network may be either a wired or wireless communication network.

The controller 13 includes hardware and software, and includes a ROM (Read Only Memory) storing a program, a CPU (Central Processing Unit) for executing a program stored in the ROM, and a RAM (Random Access Memory) that functions as an accessible storage device. As the operation circuits, MPUs (Micro Processing Unit), DSPs (Digital Signal Processor), ASIC (Application Specific Integrated Circuit, and FPGA (Field Programmable Gate Array) can be used instead of or together with CPUs (Central Processing Unit).

The controller 13 enables the communication using the server communication unit 12, determining whether to update the data, and instructing update of the map data, by executing the program stored in the ROM using the CPU. Each function of the controller 13 will be described below. In addition to the functions described below, the controller 13 has other functions such as a function for managing and updating map data recorded in the database 11.

The controller 13 communicates with the communication terminal 20 using the server communication device 12, acquires information from the communication terminal 20, or outputs information to the communication terminal 20. The information acquired from the communication terminal 20 is, for example, travel plan data related to a travel plan of the vehicle. The travel plan data includes information about the travel plan set by the user before the user gets on the vehicle 30. The travel plan includes at least one element of a destination of the vehicle 30, a departure of the vehicle 30, a travel route of the vehicle 30, a time for the user to ride the vehicle, information about the user, and a travel purpose of the vehicle. The communication terminal 20 stores a program for a planning the travel plan, which is included in the software application. The user operates the communication terminal 20 to start the program, and then inputs the information to the communication terminal 20 including a destination, a ride time, a plan departure time, and a desired arrival time. The user may input personal information of the user as an element of the travel plan when an unspecified number of users use the vehicle 30, such as car sharing. The communication terminal 20 transmits the travel plan data including the input information to the server 10 when the user has finished inputting the information. Thus, the controller 13 acquires the travel plan data through the server communicator 12.

The information output from the controller 13 to the communication terminal 20 includes information on the travel route, and information for inquiring whether the map data needs to be updated. The controller 13 calculates the travel route from the current position of the vehicle 30 to the destination when the controller 13 acquires the information such as a destination from the communication terminal 20. Then, the controller 13 outputs the information of the calculated travel route to the communication terminal 20. Further, the controller 13 asks the user whether to permit updating the map data before updating, when the controller 13 determines to need updating the map data recorded in the memory 33 of the vehicle 30. More specifically, the controller 13 outputs an inquiry signal to the communication terminal 20 to inquire of the user whether to permit the update of the map data.

The controller 13 communications with the vehicle 30 using the server communicator 12, acquires information from the vehicle 30, or outputs information to the vehicle 30. The server communicator 12 transmits and receives signals to and from an on-vehicle communicator 32 mounted on the vehicle 30. The information acquired from the vehicle 30 is update history information of map data, hereinafter also referred to as vehicle map data, stored in the memory of the vehicle 30. The update time of the vehicle map data is different from the update time of the map data stored in the database 11 of the server 10 since the vehicle 30 is not always communicating with the data center for managing map data such as the sever 10. Note that, the map data stored in the database 11 is hereinafter also referred to as server map data. The controller 13 acquires the update information of the vehicle map data to grasp an update history of the vehicle map data.

Further, the controller 13 outputs the information about the travel route calculated based on the travel plan and the map data used for travel along the travel route to the on-vehicle communication device 32. The map data used for travel in accordance with the travel plan, hereinafter also referred to as the used map data, is the map data necessary for traveling of the vehicle 30 or the map data used for the navigation system to calculate the route. For example, for the vehicle capable of automatically traveling along the travel route, the used map data is high-precision map data to be referred for executing the automatic traveling control.

The controller 13 determines the necessity of updating the map data used for travel in accordance with the travel plan in the vehicle map data. The controller 13 acquires the update information of the used map data from the vehicle 30, specifies the server map data corresponding to the used map data from the map data of the database 11. For example, the server map data corresponding to the used map data also includes the travel route from the departure point A to the destination point B when the used map data includes the travel route from the departure point A to the destination point B. The controller 13 compares the update history of the identified server map data with the update history of the used map data by the area of the map data. The controller 13 determines that the map data needs to be updated when the update history of the used map data is old. The controller 13 determines that the map data of the old area needs to be updated when the update history of the specific area is old among the map data including the travel route.

The controller 13 outputs an update instruction signal for instructing the vehicle 30 to update the map data. That is, the controller 13 outputs an update instruction signal to the on-vehicle communicator 32 when the controller 13 determines that the map data needs to be updated and receives a signal to permit the update from the communication terminal 20. The update instruction signal includes instruction data for instructing the update of the map data. In the present embodiment, the server 10 outputs the update instruction signal including the updated map data, the latest version of the map data, to the on-vehicle communicator 32 since the server 10 also has a map management function of the map data. The updated map data is for rewriting the map data needing updated among vehicle map data used in the navigation system when the vehicle travels along the travel plan.

The communication terminal 20 is a terminal device provided with an OS for a portable device and is operated by a user. The communication terminal 20 includes a memory for storing various programs, a processor for executing a program, a wireless communicator. The memory stores, for example, a software application for communicating with the vehicle 30 to transmit and receive various data. The communication terminal 20 transmits predetermined data from the wireless communicator to the vehicle 30 via the network based on an instruction operated by the user on the software application.

The vehicle 30 has a vehicle-side controller 31, an on-vehicle communicator 32, and a memory 33. The vehicle-side controller 31 calculates the current position of the vehicle by the positioning system using GPS. The vehicle-side controller 31 refers to the map data stored in the memory 33 by using the navigation system and calculates a travel route from the current position of the vehicle to a predetermined destination. The on-vehicle communicator 32 is a communicator. The memory 33 records such as map data.

Figure 2:
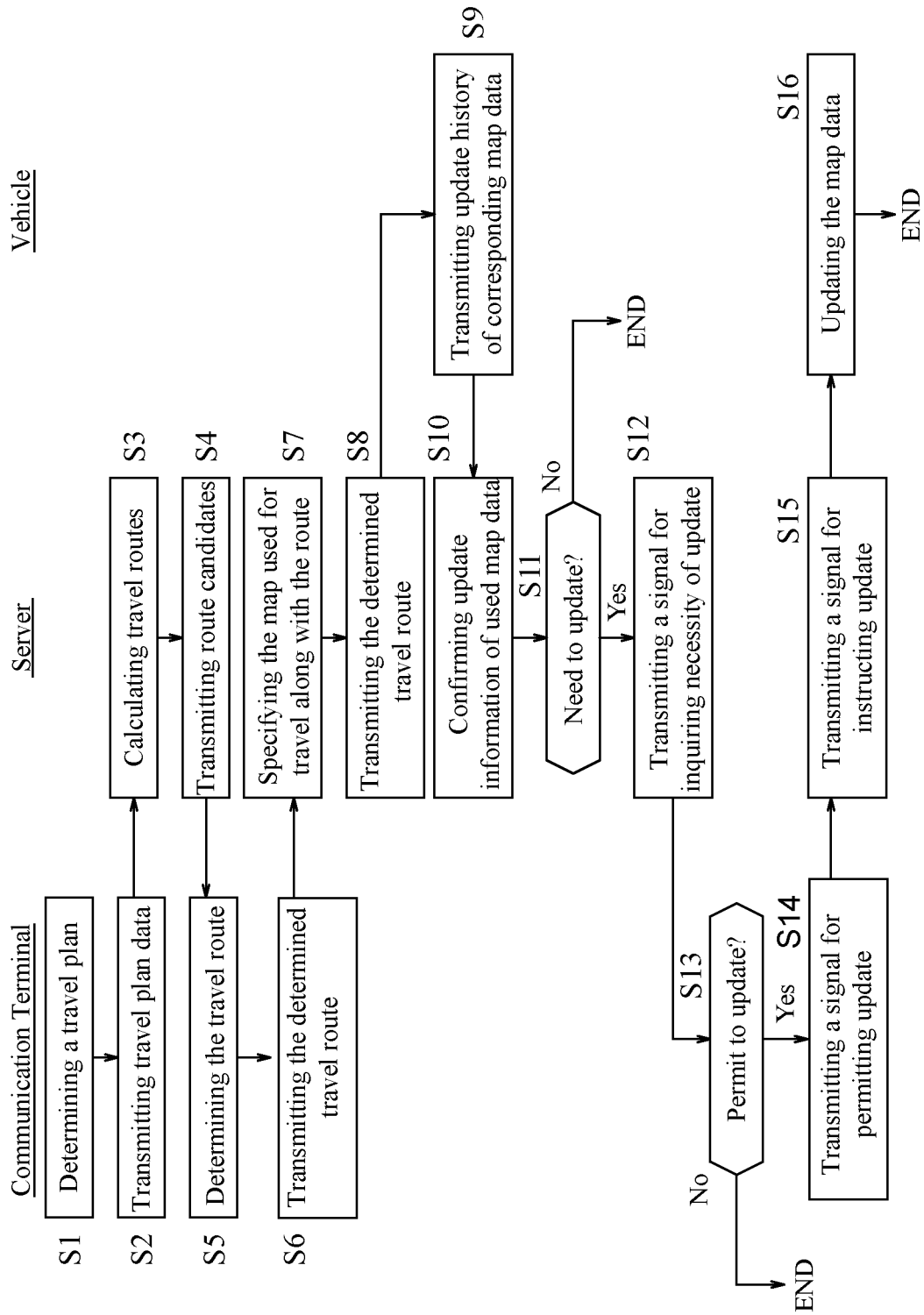
FIG. 2 is a flowchart showing an information processing procedure executed by the information processing system of FIG. 1.

Next, the respective control processes of the server 10, the communication terminal 20, and the vehicle 30 included in the information processing system of the present embodiment will be described. FIG. 2 is a flowchart showing control processing in the information processing system of the present embodiment. In FIG. 2, "communication terminal" represents control processing of the communication terminal 20. Incidentally, the control flowchart shown in FIG. 2, before the user rides on the vehicle, i.e., the vehicle 30 is executed before starting the travel.

In step S1, the communication terminal 20 determines a travel plan based on the information input by the user's operation. The determined travel plan includes at least information on the destination designated by the user and user identification information for identifying the user.

In step S2, the communication terminal 20 transmits the travel plan data including the determined travel plan to the server 10.

In step S3, the controller 13 of the server 10 calculates travel routes based on the acquired travel plan data. In the present embodiment, the server 10 stores the identification information of the vehicle 30 owned by the user, the user identification information, and the parking position of the vehicle 30 in the database 11 in association with each other. The controller 13 specifies the identification information of the user from the travel plan data. The controller 13 refers to the database 11 to specify the vehicle corresponding to the user identification information and the parking position of the vehicle. The controller 13 registers the extracted parking position as a departure point and calculates travel routes from the departure point to the destination. The controller 13 calculates a plurality of travel routes, such as a route that can arrive at a destination in the shortest distance, and a route that can arrive at a destination without traveling on a toll road.

Incidentally, the user may designate a departure point and a destination in step S1, the communication terminal 20 may transmit the travel plan data to the server 10 including the departure point and the destination designated in step S2, and the server 10 may calculate travel routes according to the designated departure point and the destination in step S3. Further, the communication terminal 20 may calculate travel routes corresponding to a departure point and a destination designated in step S1 and transmit the travel routes to the server in step S2. In this case, steps S3 to S6 are omitted, and step S7 is performed after step S3.

In step S4, the controller 13 transmits the calculated plurality of route candidates to the communication terminal 20.

In step S5, the communication terminal 20 acquires information on the plurality of travel routes and displays the travel routes on the display. The user selects one travel route from the displayed routes. This causes the communication terminal 20 to determine the travel route. In step S6, the communication terminal 20 transmits the determined travel route information to the server 10.

In step S7, the controller 13 specifies the map data to be used from the map data recorded in the database 11. The used map data will be described with reference to FIGS. 3(a) and 3(b). FIGS. 3(a) and 3(b) are a conceptual diagram for explaining the relationship among the travel route, the map data, and the update history. For example, as shown in FIG. 3(a), the controller 13 calculates the travel route R on the map represented by the map data. As shown in FIG. 3(b), the controller 13 specifies the map data including the travel route R as the used map data. In the example of FIGS. 3(a) and 3(b), the used map data are the data of areas C, F, I, and J to L among the data of areas divided into A to L. The area of the used map data is an area along the travel route. That is, the controller 13 specifies the map data to be used in units of areas including the travel route. In step S8, the controller 13 transmits the information on the determined travel route transmitted from the communication terminal 20 in step S6 and the request for the update information on the used map data specified in step S7 to the vehicle 30. The information of the determined travel route is, for example, information including a departure place, a destination, and a driving route. The request for the update information on the used map data includes, for example, information for requesting the vehicle 30 to transmit the update history of the used map data for the vehicle from the vehicle 30 to the server 10. The used map data for the vehicle is map data used for the vehicle 30 traveling along the travel route, among the map data stored in the memory 33. The request for update information about the used map data also includes area information of the used map data. The update history is expressed by the version of the used map data or the update date and time. The area information includes the position of the area on the map by an area number or an area code.

In step S9, the vehicle-side controller 31 specifies the update history stored in correspondence with the area information in response to the request of the update information related to the used map data received from the server 10. Specifically, the vehicle-side controller 31 specifies an area included in the used map data among the vehicle map data in accordance with the area information of the map data included in the used map data received from the server 10. For example, the vehicle-side controller 31 compares the object number of the used map data with the area number of each area included in the vehicle map data, and specifies an area whose area number matches the area number as an area to be an update candidate. The vehicle-side controller 31 specifies an update history, hereinafter referred to as a vehicle update history, stored corresponding to the specified area, which is to be an update candidate, in response to the update information request regarding the used map data received from the server 10. The vehicle-side controller 31 transmits the identified vehicle update history to the server 10. The vehicle update history transmitted to the server 10 may be an update history of vehicle map data corresponding to at least an area of the used map data or may be an update history of the entire vehicle map data.

In the above-described example, the vehicle-side controller 31 specifies the area of the used map data in the vehicle map data in response to the request for information on the used map data transmitted from the server 10, but the embodiment is not limited thereto. For example, the vehicle-side controller 31 may be configured to specify an area of the vehicle map data including the travel route based on the information of the determined travel route transmitted from the server 10.

In the example of FIGS. 3(a) and 3(b), the areas indicated by the used map data are the same areas C, F, I, and J to L since the travel route used for specifying the used map data on the server side and the travel route used for specifying the used map data on the vehicle side are the same route. The update history transmitted from the vehicle 30 to the server 10 is history information stored in correspondence with the areas C, F, I, and J to L. In the present embodiment, the size of the area on the vehicle map data is the same as the size of the area of the server map data for easy explanation, but the area may be different between the vehicle map data and the server map data.

In step S10, the controller 13 of the server 10 compares the vehicle update history transmitted from the vehicle 30 with the update history, hereinafter also referred to as the server update history of the used map data specified from the server map data. For example, the controller 13 compares the update history for each corresponding area. Specifically, the controller 13 compares the vehicle update history with the server update history and determines whether the vehicle update history is older than the server update history. The controller 13 may determine whether the vehicle update history is old based on the update date and time included in each update history or the version number of the map. For example, the controller 13 determines that the vehicle update history is older than the server update history when the version number of the vehicle map data included in the vehicle update history is Version 1.0 and version number of the server map data included in the server update history is Version 2.0. Further, for example, the controller 13 determines that the vehicle update history is older than the server update history when the update date and time of the vehicle map data included in the vehicle update history is May 1, 2018 and the update date and time of the server map data included in the server update history is Aug. 1, 2018.

In step S11, the controller 13 determines whether the used map data for the vehicle needs to be updated based on the comparison result by the control process in step S10. The used map data for the vehicle is the data used for the vehicle to travel along the travel route. In other words, the map data used for the vehicle is the map data used for travel along the travel route out of the map data stored in the memory 33. In step S10, the controller 13 compares the update history for each corresponding area and determines that the used map data needs to be updated when the vehicle update history has the older data of the area than the server update history. On the other hand, the controller 13 determines that the update is unnecessary when the controller determines that the vehicle update history is not older than the server update history in all the areas in the used map data of the vehicle map data. The controller 13 may determine to need the update when the area of the predetermined number or more of the areas in the used map data on the vehicle side is not the latest version. The control flowchart of the system ends when the controller has determined that the update is unnecessary.

In step 12, the controller 13 transmits an inquiry signal to inquire of the user whether to permit the update of the vehicle map data to the communication terminal 20 when the controller 12 determines to need the update. The controller 13 transmits communication environment information indicating a network state between the server 10 and the vehicle 30 when transmitting the inquiry signal.

The server 10 transmit the update map data to the vehicle 30 to update the map data of the vehicle. But any bad communication environment may take time for the server 10 to transmit data or fail to transmit accurate map data. In addition, an attempt to transmit a large amount of map data may incur a cost burden on the user under the network environment requiring billing. In view of such circumstances, the system of the present embodiment inquires of the user whether to permit the update of the map data before the updating of the map data on the vehicle side. Further, the system provides the communication environment information indicating the network state of the vehicle 30 to the user for the user determining whether to permit the update.

The communication environment information indicates, for example, a communication method used or available by the vehicle 30 for communication with the server 10 including the communication standard of the portable telephone communication network such as wireless LAN (Wi-Fi) and 3G, 4G, 5G. For example, the vehicle 30 transmits information on the communication method of the present communication: "4G" and the available communication "wireless LAN (local area network)" to the server 10 if the vehicle 30 identifies that the on-vehicle communicator 32 communicates with the server 10 using 4G and detects that a wireless LAN network is available. Before transmitting the inquiry signal to the communication terminal 20, the controller 13 acquires the information on the above-mentioned communication system from the vehicle 30, and transmits the communication environment information indicating the network state of the vehicle generated based on the information on the communication system to the communication terminal 20 together with the inquiry signal.

The inquiry signal is, for example, a message signal "Is it OK to update the vehicle map data used for travel the specified travel route? "Yes?" or "No?"" The communication environment information transmitted together is, for example, "The vehicle is currently communicating on 4G. Wireless LAN is available as another communication method. Switch the vehicle communication method to wireless LAN? "Yes" or "No?" message information.

The controller 13 may determine the communication environment by measuring the communication speed in the control processing of steps S8 to S10. Further, the controller 13 may acquire information of the current position of the vehicle from the vehicle 30 and may identify the communication environment based on such current position. The controller 13 may transmit the specified communication environment to the communication terminal 20. The network may be, for example, a local network, which can communicate within a limited area of several meters to several tens of meters, formed between the user's home and the vehicle.

In step S13, the communication terminal 20 receives the inquiry signal and the communication environment information indicating the network state of the vehicle 30, and displays a display for allowing the user to determine whether to permit the update of the map data and the communication terminal communication environment information.

For example, the communication terminal 20, based on the message information contained in the inquiry signal and the communication environment information, causes the same screen to display the message "The vehicle map data to be used for travel the specified travel route is not latest. OK to update?" "A: Yes" or "B: No" and the message "The vehicle is currently communicating on 4G. Wireless LAN is available as another communication method. Switch the network and update the vehicle map data?" "C: Yes". The messages shown in A to C can be determined by the user selecting any one by the operation of the communication terminal 20.

The user checks the display screen and selects whether to permit update. For example, in the above-described message, when the user selects A "Yes" in step S14, the communication terminal 20 transmits an update permission signal to the server 10. On the other hand, when the user selects B "No", the controller 13 determines rejection to update and the control flowchart of the system ends. When the user selects C "Yes" in step S14, the communication terminal 20 transmits an update permission signal indicating the user permitting update and a communication method switching signal indicating switching the communication method to a predetermined method, here, wireless LAN, to the server 10. The communication terminal 20 may, on good communication environment, allow the user to select the high-precision map at the time of selecting whether to permit the update of the map data.

In step S15, the controller 13 of the server 10 outputs an update instruction signal for instructing the update of the map data and a communication system switching instruction signal to switch the communication method to a predetermined method to the vehicle 30. Further, the controller 13 includes the update map data in the update instruction signal and outputs the update map data to the on-vehicle communicator 32. The updated map data may include not only the data of the area whose update history is old and subject to update, but also the map data of the area around the area to be updated. This allows to update the map data of the area surrounding the area including the travel route, thus, to use the latest map data without updating the map data during the vehicle travel when changing the travel route, for example, by bypassing the congested area.

In step S16, the vehicle-side controller 31 receives the update instruction signal using the on-vehicle communicator 32 and updates the map data by rewriting the use map data of the vehicle to the update map data. Further, the controller 31 switches the communication method of the on-vehicle communicator 32 according to the switching instruction signal when receiving the signal. Then, the control flowchart of the system ends.

As described above, according to the present embodiment, the controller 13 of the server 10 acquires the travel plan data relating to the travel plan of the vehicle 30 from the communication terminal 20 via the server communicator 12, and determines whether the map data, which is used for the travel in accordance with the travel plan from the data stored in the memory 31 of the vehicle 30, need to be updated, The controller 13 transmits an inquiry signal to inquire of the user whether to permit updating of the map data to the communication terminal 20 via the server communicator 12 when the controller 13 has determined that the map data needs to be updated. The controller 13 transmits an update instruction signal including instruction data for instructing the update of the map data via the server communicator 12 to the on-vehicle communicator 32 when receiving a permission signal to update the map data via the server communicator 12. This allows to update the map data stored in the memory 33 of the vehicle 30, regardless of whether the user is riding on the vehicle. In addition, the user can immediately use the latest map after getting on the vehicle since the map data can be updated before the user gets on the vehicle. Further, the user does not need to operate the navigation system after riding since the update of the map data allows the navigation system of the vehicle 30 to set the travel route designated by the user. In addition, the vehicle 30 can prevent from interrupting to use the navigation system due to the updating of the map data because the update of the map data before the user riding eliminates the time for updating the map data to the latest version after the ride of the vehicle 30.

In the present embodiment, the controller 13 determines whether the update is necessary based on the update history of the map data. This allows to determine whether the information on the update history of the map data is the latest.

In the present embodiment, the controller 13 transmits a signal indicating whether the vehicle 30 is connected to a predetermined communication network to the communication terminal 20 via the server communicator 12. This allows the user operating the communication terminal 20 to grasp the communication environment used when updating the map data.

In the present embodiment, the controller 13 determines whether the update is necessary based on the update history of the map data used for the travel along the travel route from the departure point to the destination in the memory 33. This allows to reduce the amount of data to be updated.

EXPLANATIONS OF LETTERS OR NUMERALS

10 Server
11 Database
12 Server communicators
13 Controller
20 Communication terminals
30 Vehicle
31 Vehicle-side controllers
32 On-vehicle communicators
33 Memory
40 Network

What is claimed is:

1. An information processing apparatus comprising:
   a communicator for communicating with an on-vehicle communicator mounted on a vehicle and a communication terminal to be operated by a user; and
   a controller configured to:
      acquire, from the on-vehicle communicator, an update history of at least some of map data stored in a storage medium of the vehicle,
      determine whether the map data needs to be updated on a basis of the update history,
      transmit an inquiry signal to the communication terminal via the communicator to inquire whether to allow updating of the map data when the controller has determined to need to update the map data, and
      transmit an update instruction signal for instructing updating of the map data to the on-vehicle communicator via the communicator when the controller has received an allowance signal for permitting updating of the map data from the communication terminal via the communicator.

2. The information processing apparatus according to claim 1, wherein
   the map data is specified based on a travel plan of the vehicle.

3. The information processing apparatus according to claim 1, wherein
the controller is configured:
acquire data related to a travel route of the vehicle from the communication terminal via the communicator;
specify the map data containing the travel route as a used map data; and
transmit the travel route and a request for update information related to the used map data to the on-vehicle communicator via the communicator.

4. An information processing system including a server, a communication terminal operated by a user, and a vehicle, wherein
the vehicle includes a storage storing map data and an on-vehicle communicator configured to communicate with the server,
the server includes a communicator for communicating with the communication terminal and the on-vehicle communicator and a controller,
the controller configured to acquire, from the on-vehicle communicator, an update history of at least some of map data stored in a storage medium of the vehicle,
the controller configured to determine whether map data needs to be updated on a basis of the update history,
the controller transmits an inquiry signal to the communication terminal via the communicator to inquire whether to allow updating of the map data when the controller has determined that the map data needs to be updated,
the controller configured to transmit an update instruction signal for instructing updating of the map data to the on-vehicle communicator via the communicator when the controller has received an allowance signal for permitting updating of the map data from the communication terminal via the communicator.

5. A method of processing information using a controller and a communicator for communicating with an on-vehicle communicator and a communication terminal operated by a user, the method comprising:
acquiring, from the on-vehicle communicator, an update history of at least some of map data stored in a storage medium of the vehicle;
determining whether map data needs to be updated on a basis of the update history;
transmitting an inquiry signal to the communication terminal via the communicator to inquire whether to allow updating of the map data when the controller has determined that the map data needs to be updated; and
transmitting an update instruction signal for instructing updating of the map data to the on-vehicle communicator via the communicator when the controller has received an allowance signal for permitting updating of the map data from the communication terminal via the communicator.

* * * * *